(No Model.)
F. FONTNEAU.
PRESS STRAINER FOR TEA OR COFFEE POTS.
No. 519,108. Patented May 1, 1894.
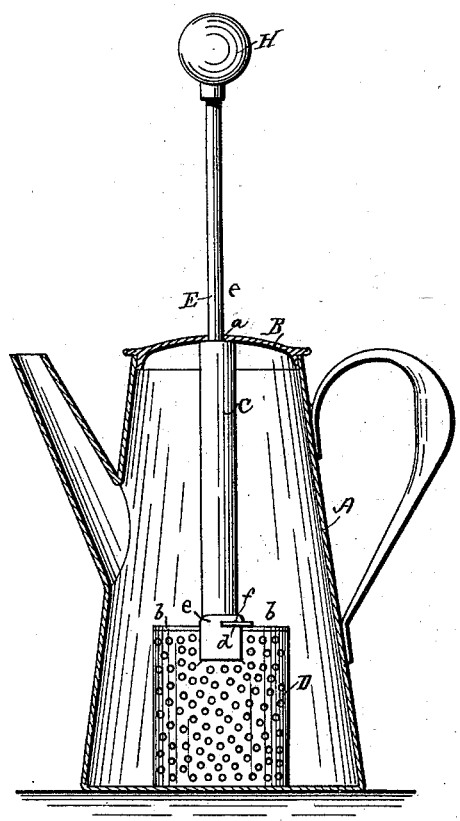
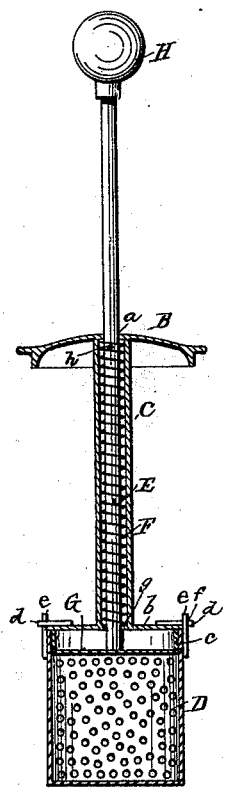
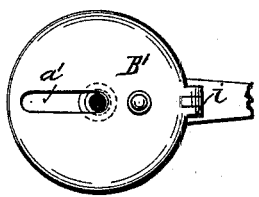
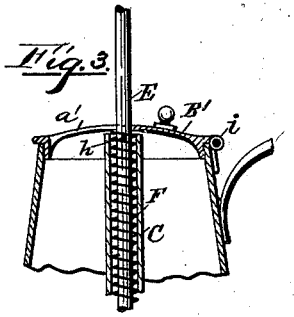
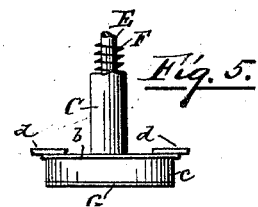
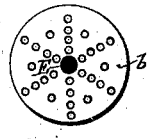
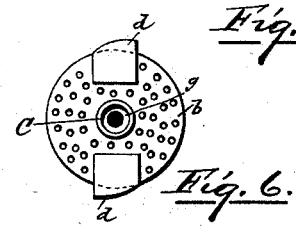
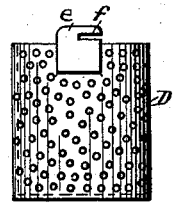
Witnesses.
Charles H Hannigan.
John S Lynch
Inventor.
Frank Fontneau
by S. Scholfield
Atty.
THE NATIONAL LITHOGRAPHING COMPANY,
WASHINGTON, D. C.

UNITED STATES PATENT OFFICE.

FRANK FONTNEAU, OF ATTLEBOROUGH, MASSACHUSETTS.

PRESS-STRAINER FOR TEA OR COFFEE POTS.

SPECIFICATION forming part of Letters Patent No. 519,108, dated May 1, 1894.

Application filed August 29, 1893. Serial No. 484,318. (No model.)

*To all whom it may concern:*

Be it known that I, FRANK FONTNEAU, a citizen of the United States, residing at Attleborough, in the county of Bristol and State of Massachusetts, have invented a new and useful Improvement in Press-Strainers for Tea or Coffee Pots, of which the following is a specification.

The object of my invention is to provide an improved press strainer for forcing the liquid extract from the tea leaves or coffee which has been steeped in the strainer, and it consists in the improved construction and arrangement of the several parts of the strainer, as hereinafter fully set forth.

Referring to the drawings: Figure 1, represents a vertical section of a tea or coffee pot provided with my improved press strainer, attached to the cover of the pot. Fig. 2, represents a vertical section of the cover and the strainer. Fig. 3, shows a modification in which the piston-rod of the strainer is held in a slot in the cover of the pot. Fig. 4, represents a top view of the cover shown in Fig. 3. Fig. 5, is a detail side view, showing the piston tube, and the disk which forms the cover of the foraminous receptacle of the strainer. Fig. 6, represents a top view of the same. Fig. 7, represents a side view of the foraminous receptacle. Fig. 8, represents a detail top view of the perforated piston, the piston rod being shown in transverse section. Fig. 9, represents an edge view of the piston.

In the drawings, A represents the tea or coffee pot which is provided with the detachable cover B, having a central perforation $a$, and an attached tube C, the lower end of which is provided with the perforated circular disk $b$, and the downwardly extending flange $c$, the said disk $b$ being also provided with the catch projections $d, d$, for locking engagement with the foraminous receptacle D, for the tea leaves or coffee to be steeped, which receptacle is provided with the ears $e, e$, having slots $f$ adapted to receive the catch projections $d, d$, of the disk $b$, to fasten the parts together, as shown in Figs. 1 and 2.

Within the tube C and perforation $a$ of the cover B of the pot is placed the piston rod E, surrounded within the tube C by the spiral spring F, and to the lower end of the piston rod E is attached the perforated disk G, which serves as a piston for compressing the steeped tea leaves or coffee in the receptacle D. The spring F is arranged to bear at its lower end against the shoulder $g$, and at its upper end against the pin $h$ in the rod E, so that when the piston G is forced downward toward the bottom of the receptacle D, by means of the knob handle H, at the upper end of the piston rod E, the resilience of the spring will cause the return of the piston to its normal elevated position, as shown in Fig. 2.

In Figs. 3 and 4, the piston rod E, instead of passing through a central perforation, passes through a slot opening $a'$ in the cover B′, which cover is attached to the pot A, by means of the hinge $i$, the tube C being in this case separate from the cover B′, so that the said cover may be raised upon its hinge $i$, without disturbing the receptacle D, and the piston rod E.

In operating the device, the fresh tea leaves or the coffee, is to be inserted into the foraminous receptacle D, and the said receptacle attached to the disk $b$ at the lower end of the tube C, by means of the slotted ears $e, e$, and the catch projections $d, d$, which are adapted to be passed laterally into the slots $f$ of the said ears, thus securely fastening the foraminous receptacle D to the disk $b$ of the tube C. When the water has been poured into the pot, and the tea leaves or coffee within the receptacle D, properly steeped, the piston G is to be forced down upon the said steeped material in the receptacle D, thus completely expelling the fluid extract from the same, into the surrounding water, thus economizing the infusion and obtaining a much stronger extract from the tea or coffee than by the method in common use heretofore, in which the tea or coffee was steeped openly in the pot without being at any time subject to pressure for expelling the extract from the same.

I do not limit my invention to the particular means for attaching the receptacle D, to the disk $b$, at the lower end of the tube C, since the same may be attached in various ways without departing from the spirit of my invention.

I claim as my invention—

1. In a press-strainer for tea or coffee pots, the combination with the foraminous receptacle, of the pot cover, the piston tube, provided with the attaching disk, the piston passing through the cover of the pot, and the actuating spring for the piston, substantially as described.

2. In a press-strainer for tea or coffee pots, the combination with the foraminous receptacle D, provided with the slotted ears $e, e$, of the pot cover B, the piston tube C, provided with the disk $b$, the downwardly extending flange $c$ and the catch projections $d, d$, the piston G, the piston rod E extending through the cover, and the spring F for actuating the piston, substantially as described.

FRANK FONTNEAU.

Witnesses:
SOCRATES SCHOLFIELD,
JOHN S. LYNCH.